United States Patent [19]

Lenke

[11] Patent Number: 4,908,984
[45] Date of Patent: Mar. 20, 1990

[54] CULTURING PLANTS WITH A DWARF HABIT

[75] Inventor: Michael Lenke, Hengersberg, Fed. Rep. of Germany

[73] Assignee: Flog AG Kunststoffwerke, Sempach-Station, Switzerland

[21] Appl. No.: 324,967

[22] Filed: Mar. 16, 1989

Related U.S. Application Data

[63] Continuation of Ser. No. 105,467, Oct. 5, 1987, abandoned, which is a continuation of Ser. No. 753,168, Jul. 9, 1985, abandoned, which is a continuation-in-part of Ser. No. 667,227, Nov. 1, 1984, abandoned.

[30] Foreign Application Priority Data

Jul. 13, 1984 [DE] Fed. Rep. of Germany ....... 3425919
Jan. 9, 1985 [DE] Fed. Rep. of Germany ....... 3500518

[51] Int. Cl.⁴ .................................. A01G 7/00
[52] U.S. Cl. .................................. 47/58; 47/66; 47/80
[58] Field of Search ............ 47/31, 59, 48.5, 58, 47/63, 64, 66, 73, 75–77, 79–82, 83–87, DIG. 10, DIG. 11

[56] References Cited

U.S. PATENT DOCUMENTS

| | | | |
|---|---|---|---|
| 2,344,794 | 3/1944 | Vallinos | 47/80 |
| 2,814,161 | 12/1957 | Hawkins | 47/38 |
| 3,513,593 | 5/1970 | Beck | 47/48.5 |
| 3,524,279 | 8/1970 | Adams | 47/77 X |
| 3,534,497 | 10/1970 | Hornbostel | 47/77 |
| 3,830,015 | 8/1974 | Belgiorno | 47/37 |
| 3,973,355 | 8/1976 | McKenzie | 47/77 |
| 4,006,558 | 2/1977 | Neddo et al. | 47/77 |
| 4,098,021 | 7/1978 | Gruber | 47/66 |
| 4,442,628 | 4/1984 | Whitcomb | 47/73 |
| 4,497,132 | 2/1985 | Whitcomb | 47/66 |

FOREIGN PATENT DOCUMENTS

| | | | |
|---|---|---|---|
| 203261 | 5/1959 | Australia . | |
| 88256 | 5/1922 | Austria | 47/58 |
| 2744143 | 4/1979 | Fed. Rep. of Germany . | |
| 3047646 | 9/1981 | Fed. Rep. of Germany . | |
| 3047818 | 7/1982 | Fed. Rep. of Germany . | |
| 1430536 | 1/1966 | France | 47/33 |
| 1477854 | 4/1966 | France | 47/80 |
| 8202349 | 1/1984 | Netherlands | 47/81 |
| 8401298 | 11/1985 | Netherlands | 47/77 |
| 381008 | 10/1964 | Switzerland | 47/64 |
| 406511 | 4/1974 | U.S.S.R. | 47/58 |
| 1400450 | 7/1975 | United Kingdom | 47/81 |

*Primary Examiner*—Danton D. DeMille
*Attorney, Agent, or Firm*—Thomas R. Vigil

[57] ABSTRACT

For culturing a plant so as to have a dwaft habit the plant is placed in cavity inside a pot made of porous material, as for example clay. The plant pot is placed in an outer vessel, preferably with a gap therebetween for water or nutrient solution. Slot-like blind channels extend horizontally into the side wall of the plant pot and/or downwards into the bottom thereof. These channels serve as traps for roots of the tangled mass of roots in the cavity so that the growth of such roots is halted and they only put out root hairs in the channels. The check in the growth of the roots of the plant causes a permanently dwarfed habit.

24 Claims, 2 Drawing Sheets

CULTURING PLANTS WITH A DWARF HABIT

This is a continuation of application Ser. No. 07/105,467, filed Oct. 5, 1987, now abandoned, which is a continuation of application Ser. No. 753,168 filed July 9, 1985, now abandoned, which is a continuation-in-part of application Ser. No. 667,227, filed Nov. 1, 1984, now abandoned.

BACKGROUND OF THE INVENTION

The present invention relates to a method of growing dwarf plants in which plant propagative material, such as a young plant, a seed, a bulb, a rooted cutting, a sucker or the like, is placed in a plant pot with a substrate whose volume is insufficient for full growth of said plant material and whose wall permits gas exchange. The invention furthermore relates to a plant pot made of a material permitting gas exchange such as fired clay.

It is a known practice to grow plants such a cactuses in pots with a greatly reduced size of frequently as little as 50 cc or even less. Such miniature cactuses then have a very slow rate of growth because of the extremely small volume in the pot so that it is possible to culture a large number of dwarf cactuses in a small space. However, there is one problem in this respect inasfar as once they have filled the pot, the roots develop as a spirally coiled cluster or tangle adjacent to the inner face of the pot wall. Such a root coil is detrimental because the roots then hardly put out any root hairs for the uptake of nutrients and sooner or later the plant will fail to flourish. To get around this difficulty it is then necessary to transfer the plant into a larger pot so that the roots will then have sufficient space and nutrient substrate and for some time at least the roots will cease to grow in a coiled form and will grow outwards into the additional nutrient medium.

However, after such repotting the plant will then grow at its normal rate because the roots now have a sufficient quantity of nutrient substrate; and after a certain growth stage of the roots, they will again start to develop in coils and further repotting will be required. As time goes on the plant will need larger and larger pots, if it is to do well, with a steady increase in size. For this reason it is only possible to delay the growth of plants, as for example cactuses, by putting them in miniature pots; true, permanent dwarf culture of the plant is not possible with this known method.

The German unexamined specification, 2,434,538 has an account of a method of growing plants such that coiling of the roots may be effectively prevented for a certain length of time if the pot is lined with a layer of open-celled soft foam with a thickness of about 1 to 10 mm.

When the roots have grown as far as this soft foam layer they firstly stop growing without forming coils and the plant puts out new, active roots in the middle of the mass of roots. It is said that in this case the stems and leaves of the plant grow very quickly and there are very small distances between the buds and the plant blooms 25 to 30 days earlier than normally would be the case in conventional pots. That is to say, the plant will be of a smaller size than in conventional pots as may be seen from FIG. 2 of the said specification as compared with FIG. 1. However, a true dwarf habit is not possible and is furthermore not intended.

On the other hand true permanent dwarf growth may be produced by the bonsai method originating in Asia. Here as well very small plant pots are used for growing the plants and at the same time the nutrient supply to the plant is very restricted. To prevent natural coiling of the roots against the pot wall regular trimming of the mass of roots is called for so that a considerable amount of time is necessary in this method of plant culture.

Lastly the Austrian Pat. No. 350,831 describes a method for limiting the amount of growth of plants involving culture in very small containers in which root coiling is prevented by having apertures in the wall of the container which are so small that they substantially prevent the growth of the roots therethrough but however allow the passage of nutrients. The container, whose wall thickness is preferably at the most four times the clearance width of the apertures, then has to be surrounded by nutrient substrate, the plant then taking up at least a part of the nutrients as needed for growth to the desired size by way of small root hairs from the surrounding nutrient substrate, whereas the porous plant container has to be of a size that is smaller than that which would be needed for growth to the desired size.

However, this method suffers from the drawback that the coiling of the roots is only effectively prevented as long as the apertures, which have a size of about 0.1 to 0.3 mm, do not become clogged. Therefore a continuous check has to be kept on the container. Furthermore the material has to meet stringent conditions as there would otherwise be a danger of the container bursting owing to the pressure of root growth with a consequent loss in the growth limiting effect. Such containers are therefore to be manufactured of non-corroding material and are preferably made of stainless steel gauze with a wall thickness of about 0.1 mm. Such materials are costly and may be hard to obtain.

SHORT SUMMARY OF THE INVENTION

One aim of the present invention is to grow plants with a permanent dwarf habit without the disadvantages involved in the prior art methods.

The way of attaining this aim is based on the surprising discovery that root coiling in pots made of conventional plant pot materials may be efficiently checked if the wall of the plant pot surrounding the mass of roots in the pot, whose volume has to be made smaller than for normal growth of the plant, is made with at least one blind channel running approximately outwards such that the roots may grow into this channel but whose width and length are so dimensioned that it is not possible for the roots to reverse their direction of growth. Since the entire mass of solid nutrient substrate has to be accommodated inside the pot, the volume of the space available for growth of the plant roots will control the size of the plant of the degree of dwarf growth, this being unlike the case with the prior art.

The invention accordingly relates to a method for the culturing of plants with a dwarf habit, in which a young plant or possibly a seed, bulb, rooted cutting, sucker or the like is placed in a plant pot with substrate having a volume that is insufficient for full growth, and having a wall permitting gas exchange, characterized in that the plant cavity in the plant pot is connected with at least one blind channel running in an outward direction and having at least generally parallel respiration-promoting walls, whose clearance width is at least long enough in its dimensions that it is possible for roots to grow into it, but at the most has a size equal to the diameter of one of the primary roots of the plant to be grown and whose length is more than twice the clearance width.

For effectively checking spiral root coiling the dimension of the blind channels is significant. The clearance width of the channels has to be at least such that not only fine root hairs may grow into it but even a complete root strand. On the other hand the clearance width is not to be made too large, because the effect of the present invention is based on the fact that owing to the small width of the blind channel the root is kept from reversing when it reaches the end of the blind channel and furthermore the increase in thickness of the roots with growth is such that the roots block the inlet of the channel.

The clearance width of the blind channel in accordance with the invention is therefore not to substantially exceed the diameter of one of the primary roots of the plant to be grown and will have to be chosen to be in line with the species of plant to be cultured.

As a general proposition this width may be in a range extending from at least a few tenths of a millimeter to several millimeters, as for example up to 5 to 7 millimeters.

A further important consideration in connection with success of the method is that a certain minimum ratio of the length, or depth, of the blind channel to the width of the channel be adhered to. This ratio is best chosen to be between three and six. At a ratio between two and three there is admittedly a fair degree of certainty that there will be no reversal, but in the case of many plants the chance of reversal of a root growing into the blind channel is not to be fully excluded under conditions favourable for plant growth. A ratio in excess of six does not have any unfavorable botanical effects, but it is to be considered that the shape of the plant pot as a whole may then be unwieldy. In practice a ratio of four to five has proved useful for most plants likely to be cultured.

If there is more than one blind channel it is preferable for them to be symmetrically arranged. Furthermore the selection of the number of the blind channels is dependent on the type of plant to be cultured and, to a certain extent, on the desired size of the plant, as the volume of the blind channels together with the volume of the plant cavity determine the size of the plant. The blind channels will normally extend in an outward direction radially i.e. into the circumferential pot wall, although in addition they may usually extend downwardly in an axial direction, i.e. into the pot bottom.

Once a plant has been placed in the plant cavity, its roots will firstly start growing in an outward direction until they reach the wall of the plant cavity. After a short length of coiled growth the roots will soon reach the aperture of one of the blind channels and will then continue radial growth in an outward direction, or if the blind channel extends into the floor part of the pot, the roots will grow axially downwards. If root growth reaches the end of a blind channel, the roots will not be able to grow back again, because the given ratio of length and depth of the blind channel to the clearance width will mean that the roots will have more or less shut off the aperture of the channel opening into the plant cavity by the time the tip of the root has reached the end of the blind channel. The extention of the tangled mass of roots of the plant is thus terminated when all roots in the tangled mass, which have grown into the blind channel or channels, have reached the end of the channel or channels. The roots whose growth has come to a halt are not able to grow in a spiral or coil and during the ensuing time they will form root hairs more or less completely filling up the blind channels; owing to the porosity of the material they are sufficiently supplied with oxygen, and preferably with water as well in the blind channel. This check on the root growth leads to a permanent dwarf habit such that the plants are not able to be distinguished from those grown using the classic bonsai method.

As noted earlier the wall of the pot cavity and of the blind channel or channels has to permit gas exchange so as to make for optimum ventilation of the roots adjacent to the wall but not able to grow into it. In accordance with a further form of the invention the porosity of the wall material, that consists of fired clay, pumice or similar materials, is such that the wall material is pervious to water and the nutrients dissolved therein. This makes it possible for the plant to be supplied with water and nutrients through the peripheral wall of the plant pot.

It has however turned out that such a supply of nutrients from the outside through the wall of the plant pot may give rise to problems, and is only possible if the material of the wall has a highly open-pored structure, something that leads to limitations in the properties of the materials used for the wall and may be responsible for difficulties such as clogging of the pores. A further possibility is that there may be a preferential supply of nutrients in parts where the wall is thinnest, that is to say more especially at the outer ends of the blind channels, i.e. where the wall is thinner than at adjacent parts of the pot so that at such positions there is likely to be an excessive supply of nutrients or overmanuring and possibly scorching of the fine root hairs.

In the course of extensive practical tests it has been proved that, more especially when using high-quality fine-pored ceramics for the manufacture of the plant pot, it is advantageous if only the water is supplied from the outside through the pot wall, whereas the nutrients, for example in the form of nutrient solutions or in a solid form, may be introduced in a downward direction into the cavity of the plant pot. It is naturally also possible to supply the water exclusively into the cavity of the plant pot. Since the wall material has to have a substantial thickness to allow for the provision of the blind channels therein, the wall will absorb and draw up water and function as a water reservoir when water is supplied in this way.

This embodiment of the method of the invention dispensing with the supply of nutrients from the outside through the plant wall, is more especially to be preferred because it represents a more reliable way of caring for the plant and, as regards the properties of the plant pot, does not call for any substantial limitations, it only being necessary for the material of the wall to be pervious to water, while on the other hand it is not necessary for there to be any transport of nutrients through the wall.

As regards simplifying the care needed for looking after the plant, it has proved advantageous to introduce the nutrients into the plant pot cavity in the form of a slow-acting manure with ion exchange properties, such manure advantageously being placed in the substrate even before potting, for example by mixing the manure with the substrate so that plant care will only amount to the periodic supply of water. With such slow-acting manures, that may be placed in the pot in the form of small particles or also in the form of tablets or in a like form, and which release their active substances only under the action of the root secretion, there will be no chance of overmanuring of the plant or a scorching of the root hairs, since overmanuring in the sense of an excessively high rate of release or an enrichment of the nutrients in the porous wall material will not be possible, something that would also lead to damage of the root hairs near the wall. Therefore the plants may be cultivated with a dwarf habit without needing any more care than regular watering, so that the culture of plants with a dwarf habit is something that will be, in contrast to all other methods known so far, quite free of problems for those without green fingers.

The invention furthermore relates to a plant pot, which is suitable for undertaking the method of the invention and is manufactured of a material allowing gas exchange, more especially fired clay and which is characterized by a cavity in the pot, for the plant, extending outwards in the form of one blind channel or two or more such blind channels in a symmetrical arrangement, such channel being at right angles to a bottom of the pot and extending out beyond the said cavity into the thickness of the wall of said cavity and/or the bottom thereof, such channel having an inner open end opening into the said cavity, such slot-like blind channel having a clearance width in a range extending from some tenths of a millimeter to several millimeters and having a depth amounting to more than twice the clearance width.

Both the plant cavity of the plant pot in accordance with the invention and also the pot itself may have a very large number of different forms. To take an example, the plant cavity may be round, quadrilateral or polygonal. The lengthways cross section may be of equal diameter from end to end, but preferably it becomes narrower towards the bottom so as not to depart from the traditional form. The wall of the plant cavity may be internally smooth or grooved, the latter form leading to an increase in the specific surface area and therefore contributing to an improved supply with oxygen and/or water.

The entire plant pot may also, and independently from the form of the cavity for the plant within it, be round, quadrilateral or polygonal. It has to be of a size to allow for the blind channels that extend outwards from the plant cavity. These blind channels may also be formed within inserts placed in the plant pot and decreasing its volume. However it is preferred to design the pot with such a wall thickness that all blind channels extending from the plant cavity are accommodated therein.

In order to fulfill the purpose of the invention it suffices if only one blind channel is provided. If more than one blind channel be present, then it is preferred for these to be placed symmetrically in the plant pot. In such a case with two to four oppositely placed slot-like channels it is possible for opposite channels to be joined together by slots in the bottom of the pot. The slot-like blind channels may be of equal length or they may be unequal in length, the latter possibility being the case more especially in polygonal bowls whose internal cavity, for the plant, is assymmetrical in line with the bonsai tradition.

It is preferred for the depth of the channels to be three to six times their clearance width, the more limited range for the preferred depth range being four to five times the clearance width.

Seeing that the circumferential wall of the plant pot is made of a material which permits gas exchange and is preferably pervious to water, even if it is not completely pervious with respect to dissolved nutrients, it is best for the pot to be surrounded by a water-impervious layer on the bottom and walls in order to cut down loss of water by evaporation in an outward direction.

In the case of plant pots that are intended for use in the method of the present invention, with an external supply of water or even nutrients, this layer may be produced quite simply by placing the pot in a cover of material impervious to water, such as glazed ceramic ware, earthenware, porcelain, synthetic resin, metal or impregnated wood or the like, the size of such outer cover being so large that there is a gap between the outer cover and the plant pot as such, such gap serving as a reservoir for water or for a nutrient solution. This gap may be made broader at some positions, as for example at the corners in the case of polygonal pots, in order to form a watering hole facilitating the operation of pouring water into the arrangement.

If there is no provision for the supply of water and/or nutrient from the outside through the wall, the outer cover may also be such that it makes contact with the outer part of the plant pot completely. In such a case the supply of water will have to be via the plant pot cavity, it being convenient in this connection to provide the top side of the plant pot with a conically converging face running downwards and inwards so that the introduction of the liquid directly into the substrate in the plant pot cavity will be simplified.

For plants above a certain size it is convenient to make the outer cover or vessel so as to have a certain degree of mechanical strength and not to have any gap between the outer skin and the plant pot as such, since the roots of large plants may cause the plant pot as such to burst open. In this case it is convenient for the plant vessel itself to be provided with a water-proof and preferably diffusion-proof cover layer in the form of a coating on the circumferential wall of the plant pot. Such a coating may for example take the form of a directly fired-on glaze, this being an advantage as regards production and it furthermore makes the pot highly appealing to the eye. However it is also possible to put on coatings of a different form, for example by painting, dipping or spraying. The materials then used may for example be resins or wax. This offers the advantage that the high firing temperature needed for glazing is not necessary and there will be a great range of variation as regards coloration and artistic design.

As already mentioned, the top part of the wall of the plant vessel has to be kept free of coating in order to permit gas exchange with the atmosphere.

It is naturally also possible to design the plant pot with more than one plant cavity therein of a suitable size so that there is then the possibility of having an arrangement of several plants in a group.

A more detailed account of the invention will now follow with reference to the accompanying drawings.

LIST OF FIGURES

DESCRIPTION OF EMBODIMENTS

Figure 1:
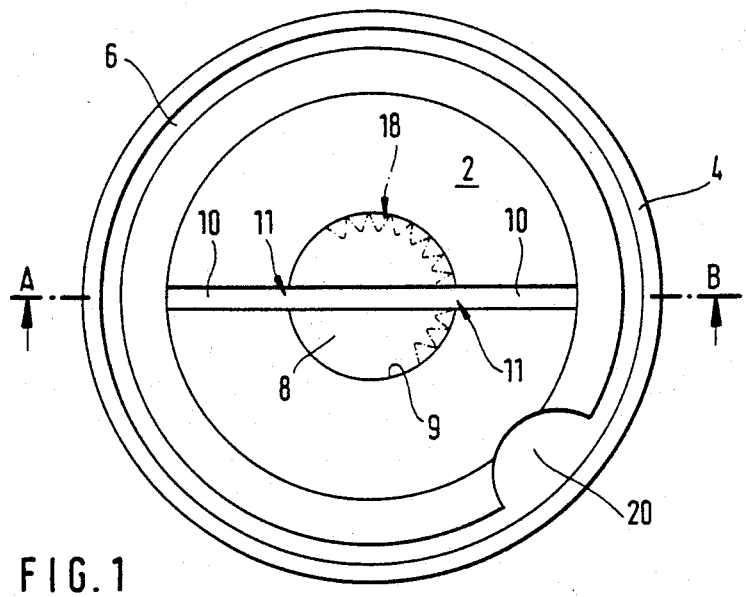
FIG. 1 is a plan view of a plant pot with an outer cover or outer pot leaving a gap between it and the plant pot.
Figure 2:
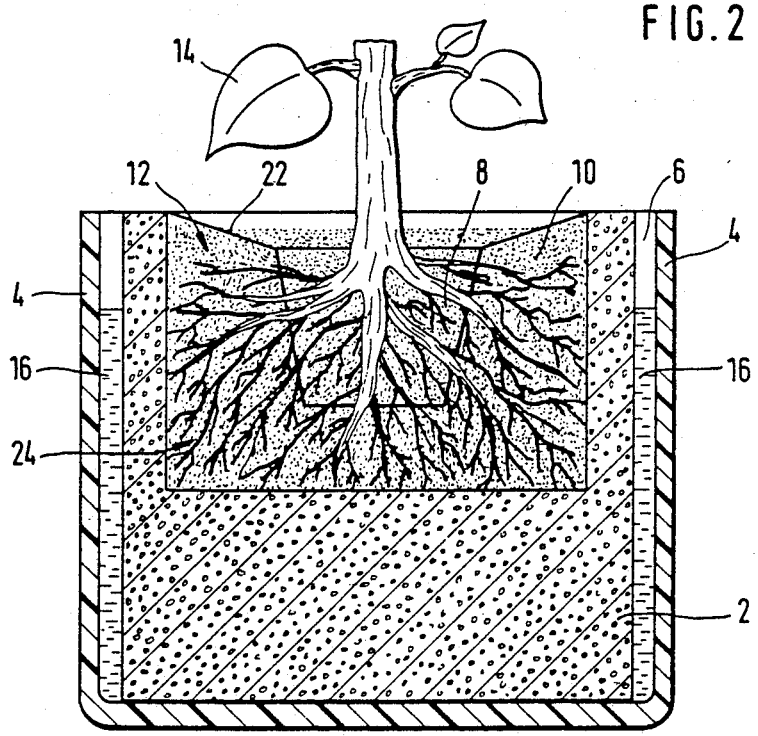
FIG. 2 is a section through the plant pot to be seen in plan view taken on the line A-B.

FIG. 1 shows a plant pot 2 with a round design, it being so accommodated in a water-tight receiving vessel 4 that there is a gap between them. There is an approximately coaxial round plant or pot cavity 8 that becomes narrower frustoconically as will be seen from FIG. 2. Two oppositely placed blind channels 10 are formed extending from the plant cavity 8, of which each one, as will be seen from FIG. 2, takes the form of a slot that is open at its top, and which is continued under the bottom of the plant cavity 8 to make a connection with the other. These slots 10 have radially inner openings 11 into the plant cavity 8. The plant cavity 8 is filled with a substrate 12 and serves to accommodate the plant 14, the roots 24 of which have already grown into the blind channels 10, as also indicated in FIG. 2.

The gap 6 between the receiving vessel 4 and the plant pot 2 is filled with water 16, something readily carried out by pouring the water into the watering hole 20.

In addition the wall of the plant pot 2 is designed with a gently sloping conical rim face 22 to facilitate pouring water or nutrient solution into the plant cavity 8. The inner frusto-conical face 9 of the pot around the plant cavity 8 is grooved at 18 in FIG. 1. Since the water 16 is stored outside the plant pot 2, it has to make its way through the porous material of the plant pot 2 prior to reaching the tangled roots 24 of the plant 14. When this takes place the porous material of the plant pot 2 absorbs water so that the plant 14 is protected against desiccation if the owner should forget to top up the gap with water in good time.

Figure 3:
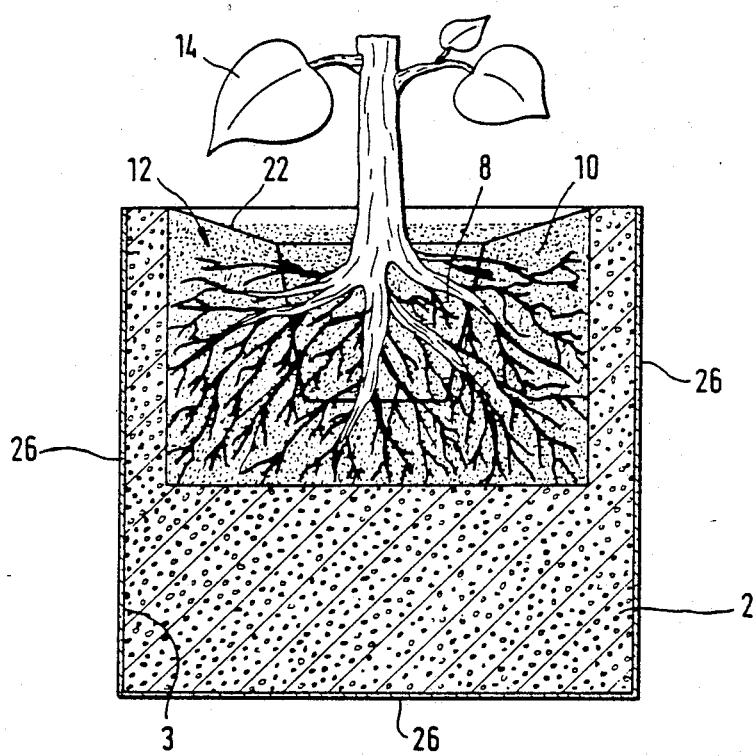
FIG. 3 shows a plant pot in keeping with the invention without an outer gap and with a water-proof outer skin contacting it.

A form of the plant pot in keeping with the invention, in which there is no gap and the pot is covered with a water-proof coating, is to be seen in FIG. 3. In this figure the reference numerals have the same meanings as in FIGS. 1 and 2. The water-proof covering layer, that adheres to the outer circumferential wall 3 of the plant pot 2, is referenced 26. Since with this form of the plant pot, in keeping with the invention, an external supply of water is not possible through the wall, all the water has to be supplied from the plant cavity using the sloping part 22. It is naturally possible to make many variations in the design of the pot, for example as regards the form, number and placement of the blind channels etc. In this respect, a second blind channel is shown in FIG. 1 at 28. To take an example, the blind channels might be made so as not to extend into the bottom part of the pot.

With reference to FIGS. 1 and 2, the plant pot 2 has a bottom portion 40 having a top surface 42 and a lower surface 44 and a perimeter wall portion 46 having a frusto-conical inner face 48 and an outer face 50. The grooves 18 and blind channels 10 (and 28) extend into the frusto-conical inner surface 48.

Using the method and the plant pots of the present invention it is therefore possible to grow attractive looking decorative plants with a dwarf habit with little trouble and without specialized horticultural knowledge. However the method described herein is naturally not limited to decorative plants and the method of the invention may also be used for the culture of crop plants, as may for example be of value for plant breeding. In this respect it significant that the method of the invention does not have a permanent effect on a plant in the sense that when the plant is transferred to a conventional pot or to natural soil it may immediately grow naturally again.

The term "primary root" herein is used in the sense of roots with a diameter above that of root hairs.

I claim:

1. A method of culturing a plant so as to have a healthy dwarf growth habit, the plant having plant primary roots and requiring a normal volume of substrate to attain full growth, said method comprising:

providing a plant pot assembly including a receiving vessel containing a plant pot, said plant pot having outside overall dimensions and being fabricated from a fine-pored, ceramic material which permits fluid exchange therethrough, said pot comprising wall means surrounding a central plant cavity having a generally circular top opening and including a bottom portion having a top surface and a lower surface, and a perimeter wall portion having a generally circumferential inner face, a circumferential outer face and a thickness between said inner and outer faces at the bottom of said cavity which is at least equal to the radius of said cavity at the bottom thereof, said central cavity being defined by the center space enclosed by said top surface of the bottom portion and said generally circumferential inner face, said cavity being generally circular at the bottom thereof, said outer face having a diameter which is at least twice the diameter of said inner face at the bottom of said cavity, said perimeter wall portion extending upwardly from the top surface of said bottom portion, the cavity being closed at a lower end thereof by said bottom portion to form the plant cavity with a small dimension relative to the outside overall dimensions of said plant pot and sized to accept a volume of substrate less than the normal volume required for full plant growth;

providing in said wall means at least one groove extending radially outwardly from said inner face toward said outer face for a predetermined depth between said inner face and said outer face, said groove extending downwardly from a top surface of said wall means, providing said groove with a sufficient width along said inner face to allow a plant root to grow into and along said groove but insufficient to allow the root to turn around therein or grow sideways, eliminating girdling of said root along said inner face of said perimeter wall portion, and said plant pot material preventing root penetration of said wall means, whereby the primary plant roots are limited to less than normal full growth;

filling the small plant cavity of the plant pot with a volume of substrate less than the normal volume required for full plant growth;

placing plant propagative material in said substrate; and feeding said plant propagative material with nutrient material to maintain the life of the plant at a state of healthy dwarfed growth.

2. The method of claim 1 including the step of forming said groove as a blind channel extending into said perimeter wall portion of said wall means from said plant cavity from said top surface of said pot downwardly into said bottom portion of said wall means.

3. The method of claim 2 including the step of forming a second blind channel in said perimeter wall portion symmetrically opposite said first blind channel said first and second blind channels forming a pair of channels that connect with each other in said bottom portion of said pot.

4. The method as claimed in claim 2 wherein the channel is formed to have a depth about three to six times the channel width.

5. The method as claimed in claim 4 wherein the channel is formed to have a depth about four to five times the channel width.

6. The method of claim 1 wherein the step of furnishing a plant pot includes furnishing wall means which are perveous to water but substantially imperveous to nutrients; and the step of feeding includes supplying water to plant propagative material through said wall means and at the top of said plant cavity, and nuturing said plant propagative material by applying nutrients only to the substrate within the plant cavity.

7. The method of claim 1 including the step of providing a plurality of converging groove pairs in said perimeter wall portion symmetrically around said plant cavity.

8. The method of claim 1 wherein the step of providing said at least one groove includes the step of forming said at least one groove to have a generally V-shaped cross-section.

9. A plant pot assembly including a receiving vessel containing a plant pot, said plant pot having outside overall dimensions and inside dimensions for growing a healthy plant with a dwarf habit, said pot being fabricated from a fine-pored, ceramic material which permits fluid exchange therethrough and said pot comprising:

wall means surrounding a central plant cavity, said cavity having a generally circular top opening and said wall means including a bottom portion having a top surface and a lower surface, and a perimeter wall portion having a generally circumferential inner face, a circumferential outer face and a thickness between said inner and outer faces at the bottom of said cavity which is at least equal to the radius of said cavity at the bottom thereof, said central cavity being defined by the center space enclosed by said top surface of said bottom portion and said generally circumferential inner face, said cavity being generally circular at the bottom thereof, said outer face having a diameter which is at least twice the diameter of said inner face at the bottom of said cavity, said perimeter wall portion extending upwardly from the top surface of said bottom portion with the inner face of said perimeter wall portion defining said center space, said plant cavity being closed at a lower end thereof by said bottom portion to form the plant cavity with a small dimension relative to the outside overall dimensions of said pot, and said wall means having at least one groove therein extending radially outwardly into said perimeter wall portion from said inner face, toward said outer face, for a predetermined depth between said inner face and said outer face, said groove extending downwardly from a top surface of said wall means, said groove having a width along the perimeter of said inner face sufficient to allow a primary plant root to grow into and along said groove, but insufficient to allow said root to turn around therein or grow sideways, eliminating girdling of said root along the inner face of said perimeter wall portion and said pot material preventing root penetration of said wall means, whereby the primary plant roots are limited to less than normal full growth, so that a plant may be maintained at a state of healthy dwarfed growth.

10. The plant pot assembly as claimed in claim 9 wherein said groove is a blind channel that extends downwardly from a top surface of said perimeter wall portion and into said bottom portion, said blind channel extending into said perimeter wall portion a distance more than one half the thickness of said perimeter wall portion.

11. The plant pot assembly as claimed in claim 10 wherein a second groove in the form of a blind channel extends into said perimeter wall portion at a position directly opposite to a circumferential position of said first named blind channel and merges with said first named blind channel in said bottom portion.

12. The plant pot assembly as claimed in claim 9 wherein said top surface of said wall means has an inner upper sloping surface which slopes downwardly toward said generally circumferential inner face.

13. The plant pot assembly as claimed in claim 9 wherein said receiving vessel surrounds said bottom portion of said wall means and at least the lower portion of said perimeter wall portion and is spaced from said outer face by a reservoir gap for receiving and holding liquid therein to maintain the life of a plant received in the plant cavity of said pot.

14. The plant pot assembly as claimed in claim 9 wherein said groove is a blind channel having a channel width from between about three tenths of a millimeter to about seven millimeters.

15. The plant pot assembly as claimed in claim 14 wherein a ratio of channel width to channel depth is between 1:3 and 1:6.

16. The plant pot assembly as claimed in claim 15 wherein a ratio of channel width to channel depth is between 1:4 and 1:5.

17. The plant pot assembly as claimed in claim 9 wherein said groove is a blind channel which extends radially into said perimeter wall portion a depth equal to at least twice the channel width.

18. The plant pot assembly as claimed in claim 17 including a plurality of said radially extending blind channels positioned symmetrically around said plant cavity.

19. The plant pot assembly of claim 9 wherein said groove has a generally V cross-section.

20. The plant pot assembly of claim 9 wherein said inner face of said plant pot has a plurality of grooves therein extending downwardly from said top surface of said wall means.

21. The plant pot assembly as claimed in claim 9 having at least one pair of grooves, each groove of said pair being generally symmetrically opposite the other groove.

22. The plant pot assembly as claimed in claim 9 wherein said receiving vessel is a liquid-proof coating on at least a portion of said outer face of said wall means.

23. The plant pot assembly as claimed in claim 22 wherein said coating is selected from the group comprising: a ceramic glaze, a coating applied by painting, a coating applied by spraying, a coating applied by dipping.

24. The plant pot assembly of claim 9, wherein said generally circumferential inner face is a frusto-conical surface which inclines downwardly and inwardly from said top surface of said wall means.

* * * * *

UNITED STATES PATENT AND TRADEMARK OFFICE
CERTIFICATE OF CORRECTION

PATENT NO. : 4,908,984
DATED : March 20, 1990
INVENTOR(S) : Michael Lenke

It is certified that error appears in the above-identified patent and that said Letters Patent is hereby corrected as shown below:

On the title page assignee should read

--(73) Assignee: Folag AG Kunststoffwerke,
Sempach-Station, Switzerland--.

Signed and Sealed this

Sixth Day of November, 1990

Attest:

HARRY F. MANBECK, JR.

*Attesting Officer*  *Commissioner of Patents and Trademarks*